No. 726,182. PATENTED APR. 21, 1903.
T. S. MOUNT.
AUTOMATIC COMPUTING AND WEIGHING SCALE.
APPLICATION FILED OCT. 27, 1902.
NO MODEL.
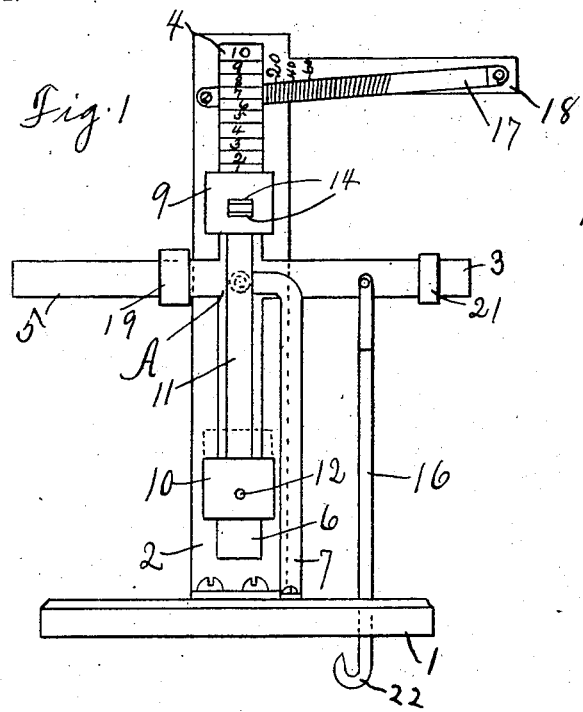
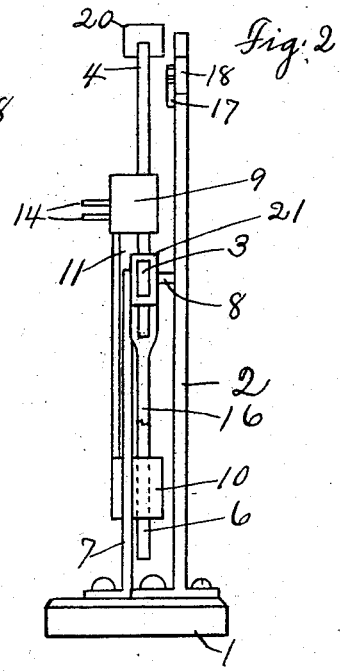
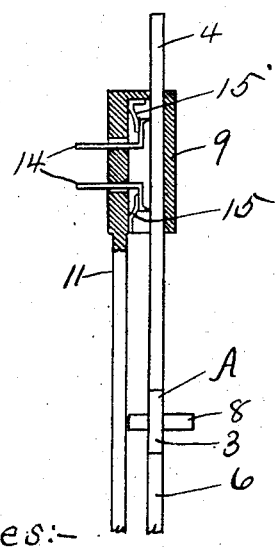
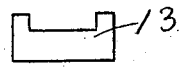
Witnesses:—
J. W. Stitt
L. B. Wimman
Inventor,
T. S. Mount,
By A. L. Jackson,
Attorney.

UNITED STATES PATENT OFFICE.

TIMOTHY S. MOUNT, OF RHOME, TEXAS.

AUTOMATIC COMPUTING AND WEIGHING SCALE.

SPECIFICATION forming part of Letters Patent No. 726,182, dated April 21, 1903.

Application filed October 27, 1902. Serial No. 128,857. (No model.)

*To all whom it may concern:*

Be it known that I, TIMOTHY S. MOUNT, a citizen of the United States, residing at Rhome, in the county of Wise and State of Texas, have invented certain new and useful Improvements in Automatic Computing and Weighing Scales, of which the following is a specification.

This invention relates to weighing-scales, and more particularly to scales which will weigh and compute and indicate the total cost of goods or articles at any ordinary price per pound; and the object is to construct a weighing machine or scale which will indicate absolutely correct weights and which can be readily set to compute the cost of articles at any reasonable price per pound and which will indicate the total weight and the total cost.

Other objects are to construct a weighing-machine which is simple in construction, which can be manufactured at small cost, and which is practical and durable.

The construction will be fully explained in the following description, and the invention will be more particularly pointed out in the appended claims.

Reference is had to the accompanying drawings, which form a part of this specification and application.

Figure 1 is a front elevation of the scales in detail. Fig. 2 is a side elevation of the same. Fig. 3 is a vertical section of one of the sliding weights, showing the manner of holding the weights at any adjustment on the weighing-cross. Fig. 4 illustrates an additional weight which may be added to the lower sliding weight.

Similar characters of reference are used to indicate the same parts throughout the several views.

The scales are provided with a suitable base 1 and an upright frame-piece 2. A cross having arms 3, 4, 5, and 6 is pivotally mounted on the frame-piece 2 and the upright bearing 7. The frame 2 and the bearing-piece 7 may be attached or bolted to the base 1 in any suitable manner. The bearing-piece 7 must be placed on one side of the cross A, so that it will not obstruct the movements of the sliding weights, hereinafter described. The pivotal rock-shaft 8 must have a bearing on each side of the cross A. Sliding weights 9 and 10 are mounted on the arms 4 and 6 of the cross A, respectively. The weights 9 and 10 are connected by a bar 11. One of the weights, as weight 9, may be made integral with the bar 11. The other weight, 10, would have to be secured to the bar 11, and the weight may be secured to the bar by inserting the end of the bar in the weight and securing the bar in the weight by means of a pin 12. Additional weights 13 may be placed on the weight 10. The additional weight 13 would occupy the position shown by dotted outline in Fig. 1. A scale of prices may be made on the arm 4, and the top edge of the weight 9 may be the indicator. The weights 9 and 10 are slidable on the arms 4 and 6 and are held against sliding by means of spring-pressed clasps 14, which have edges pressed against the arm 4 of the cross by means of the springs 15, mounted in a cut-out in the weight 9. The clasps 14 extend out of openings in the front side of the weight, so that they can be grasped by the fingers. A person can take hold of the clasps and set the weight so that the top edge of the weight will stand at any price marked on the arm 4. The article to be weighed is suspended from the arm 3. The rod 16, which is pivotally attached to arm 3 and provided with a hook 22, illustrates one way of suspending articles to be weighed. The hook 22 may engage the lever of any suitable platform. The weight of the article causes the arms of the cross to rock or turn in the direction of the hands of a clock. An arm or beam 17 for making a scale of total cost of articles is attached to the frame-piece 2 and to an arm 18 of said frame-piece. A scale of total costs from five cents up to any convenient sum may be made on the beam 17, as up to five dollars or ten dollars. The beam 17 will have to be located by experiment. The spaces between the total-cost marks must be of equal width. This beam 17 may be in or near a horizontal position. The edge of the arm 4 is the indicator for the total cost or the total weight—that is, this arm will be rocked or turned by the weight of the article, so that the edge of the arm 4 will stop at the particular mark on the beam 17 which will indicate the cost of the article or the weight of the article. For instance, an article weighing three pounds is placed on the scales and the cost of the article being seven cents a pound, move up the weight 9 to the "7 cts." mark. The arm 4 will move in a curve or rock until the edge of the arm 4 will stop at the "21 cts." mark on the beam 17, or, if it is desirable to determine the weight of the article, set the weight 9 at the "1 ct." mark and place the article on the scales. The arm 4 will move until it stops at the mark "3" on the beam 17, which will mean that the article weighs three pounds. Thus the marks on the beam 17 can represent cents or pounds.

Another illustration: A party wants seventy-five cents' worth of something that is worth six cents a pound. Move the weight 9 to the "6 cts." mark on the arm 4. Then place enough of the article on the scale to cause the arm 4 to turn or rock until the edge of the arm 4 stops at the "75 cts." mark on the beam 17. If the beam 17 has notation for only ten dollars and a party wants more than ten dollars' worth, place a weight 13, which represents ten dollars or one thousand pounds, on the weight 10 and proceed as above. If the party wanted as much as fourteen dollars and fifty cents' worth of four-cent goods, set the weight 9 at the "4 cts." mark. Then put the goods on the scales until the arm 4 stops at the "$4.50" mark on beam 17. The party would have three hundred and sixty-two and one-half pounds of four-cent goods. The weights 13 may be made to indicate any convenient amount or represent any convenient weight, as one-hundred-pound weight, two-hundred-pound weight, &c., and the same weight 13 may represent one dollar, two dollars, &c.

Weights may be placed on the weight 10 or on the arm 5 or arm 4. To illustrate: If a party wants more of an article than the scale above described will compute, as one hundred and thirty-seven pounds of seventy-three-cent goods, put a weight 13, representing one hundred dollars, on weight 10, set the weight 9 at the "1 ct." mark, put goods on the scales until the arm 4 registers "137" on the beam 17. This determines the pounds. Then set the weight 9 at the "73 cts." mark on arm 4. The arm 4 would then register "1 ct." on the beam 17. This one cent, with the one hundred dollars represented by the weight 13, would make one hundred dollars and one cent, the cost of the goods. The same result may be reached in another way. Move the weight 19 so that it will register one hundred pounds on the arm 5. Set the weight 9 at the "1 ct." mark on the arm 4, put on goods until the arm 4 registers "37" on the beam 17. This thirty-seven pounds, with the one hundred pounds represented by the weight 19, would be the weight. Then set the weight 9 at the "73 cts." mark on the arm 4. The arm 4 would then register "$27.01" on the beam 17. This twenty-seven dollars and one cent, with the seventy-three dollars, the cost of one hundred pounds, would make the one hundred dollars and one cent. If the arm 4 does not show prices above one dollar and a party wanted goods worth one dollar and twelve cents, weights 20 may be placed on top of the arm 4. Put a one-dollar weight on top of the arm 4 and move the weight 9 to the "12 cts." mark on the arm 4. The arm 4 will then register the correct total cost on the beam 17. The weight must be determined before the weight 20 is placed on the arm 4.

For simply weighing an article set the weight 9 at the "1 ct." mark on arm 4 and put the article on the scales. The arm 4 will register the weight of the article on the beam 17. If the weight of the article is too great to be weighed in this manner, move the weight 19 on the arm 5 to represent one hundred, two hundred, &c., pounds, which must be added to the pounds registered by the arm 4 on beam 17.

Having fully described my invention, what I claim as new and desire to secure by Letters Patent, is—

1. Automatic computing and weighing scales comprising a cross pivotally mounted and having vertical and horizontal arms, the upper vertical arm having a scale of prices marked thereon, means for suspending articles to be weighed on one of said horizontal arms, sliding weights mounted on said vertical arms, and a registering-beam mounted adjacent to said vertical arm.

2. Automatic computing and weighing scales comprising a cross pivotally mounted and having vertical and horizontal arms, the upper vertical arm having a scale of prices marked thereon, weights mounted on and slidable on said vertical arms and having a bar connecting the weights, means for suspending articles to be weighed on one of said horizontal arms, and an indicating-beam mounted adjacent to said upper vertical arm.

3. Automatic computing and weighing scales comprising an upright beam pivotally mounted at its central part, the upper part thereof having a scale of prices marked thereon, means for suspending articles to be weighed on one side of said beam adjacent to its pivot, connected weights mounted on said beam above and below said pivot and slidable on said beam, and a registering-beam mounted adjacent to the upper part of said pivoted beam.

4. Automatic computing and weighing scales comprising a cross pivotally mounted with its arms resting normally in vertical and horizontal positions, connected weights mounted on the vertical arms and slidable thereon, means for clamping one of said weights to one of the vertical arms at various adjustments, means for suspending articles to be weighed on one of said horizontal arms, and a registering-beam mounted adjacent to the upper vertical arm.

5. Automatic computing and weighing scales comprising a cross pivotally mounted with its arms resting normally in vertical and horizontal positions, weights mounted on the upper and lower vertical arms, said weights being connected together whereby the moving of one weight will cause the other weight to be moved, a scale of prices marked on the upper vertical arm, the upper weight serving as an indicator, means for suspending articles to be weighed on one of said horizontal arms, a supplemental weight for the other horizontal arm, supplemental weights for the upper and lower vertical arms, and a registering-beam mounted adjacent to the upper vertical arm, the upper vertical arm serving as the indicator.

In testimony whereof I set my hand, in the presence of two witnesses, this 20th day of September, 1902.

TIMOTHY S. MOUNT.

Witnesses:
A. L. JACKSON,
J. W. STITT.